United States Patent [19]
Snyder et al.

[11] Patent Number: 5,102,637
[45] Date of Patent: Apr. 7, 1992

[54] METHOD OF PURIFYING ZIRCONIUM TETRACHLORIDE AND HAFNIUM TETRACHLORIDE IN A VAPOR STREAM

[75] Inventors: Thomas S. Snyder, Oakmont, Pa.; Richard A. Stoltz, Plano, Tex.

[73] Assignee: Westinghouse Electric Corp., Pittsburgh, Pa.

[21] Appl. No.: 597,254

[22] Filed: Oct. 12, 1990

[51] Int. Cl.$^5$ .................. C01B 33/08; C01G 25/04; C01G 27/04; B01D 39/00
[52] U.S. Cl. .................. 423/240 S; 55/69; 55/71; 423/77; 423/341
[58] Field of Search .................. 423/240 S, 341, 77, 423/79; 55/69, 71, 72

[56] References Cited

U.S. PATENT DOCUMENTS

| | | | |
|---|---|---|---|
| 2,914,379 | 11/1959 | Forman | 423/341 |
| 3,388,993 | 6/1968 | Peterson et al. | 55/71 |
| 3,653,620 | 9/1962 | Greenberg et al. | 423/77 |
| 4,053,558 | 10/1977 | Campbell | 423/240 S |

OTHER PUBLICATIONS

"Purification of SiCl$_4$ by Adsorption Techniques", H. C. Theuerer, Journal of the Electrochemical Society, vol. 107, No. 1, pp. 29-32, (Jan. 1960).

Primary Examiner—John Niebling
Assistant Examiner—Brian M. Bolam
Attorney, Agent, or Firm—J. C. Valentine

[57] ABSTRACT

A vapor stream from a sand chlorinator containing principally zirconium tetrachloride, hafnium tetrachloride and silicon tetrachloride contaminated with ferric chloride is purified by cooling the vapor to a temperature of about 335° C. to about 600° C. The cooled vapors flow through a gaseous diffusion separative barrier where a silicon tetrachloride vapor stream contaminated with metal chlorides flows from the separative barrier as a "fast" stream; ferric chloride is adsorbed by the separative barrier; and a vapor stream principally containing zirconium tetrachloride, hafnium tetrachloride and silicon tetrachloride is screened by the separative barrier.

6 Claims, 1 Drawing Sheet

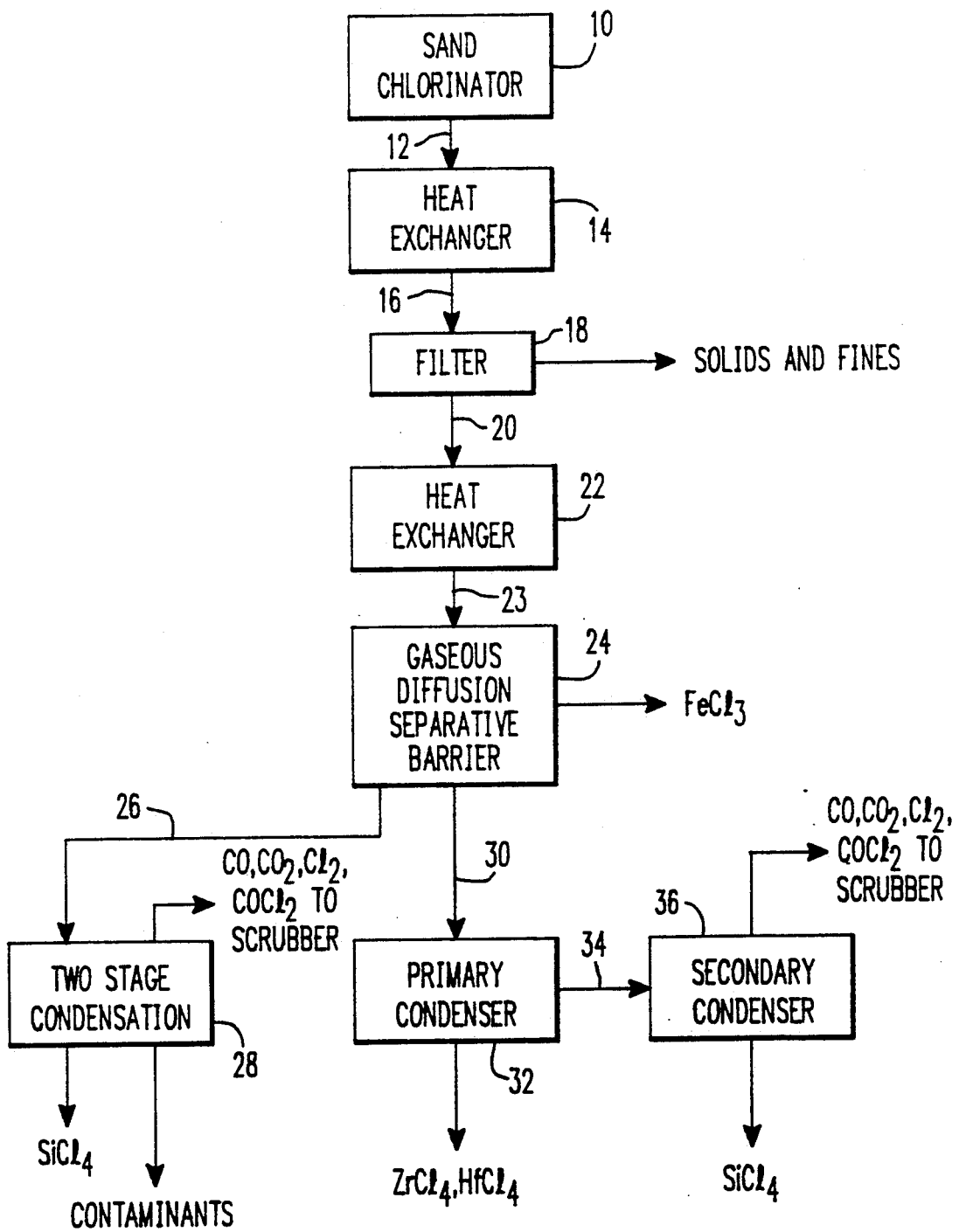

METHOD OF PURIFYING ZIRCONIUM TETRACHLORIDE AND HAFNIUM TETRACHLORIDE IN A VAPOR STREAM

This invention relates to a method of purifying zirconium tetrachloride and hafnium tetrachloride in a vapor stream from a sand chlorinator, and more particularly to a method for removing ferric chloride and other metallic chloride impurities from the vapor.

In the commercial production of zirconium and hafnium from zircon sand or other similar sources, the sand is chlorinated at temperatures of about 800° C. or more to produce a vapor containing zirconium tetrachloride, hafnium tetrachloride and silicon tetrachloride. The vapor also contains trace amounts of volatile chlorides of impurities in the sand, including principally iron but also aluminum and phosphorous. Depending upon its source, the sand may also contain additional metal impurities including magnesium, titanium, nickel, chromium, boron, copper and manganese. Thus, the vapors from zircon sand chlorinator generally contains trace amounts of ferric chloride, aluminum chloride and phosphorous chloride. U.S. Pat. No. 3,098,723, for example, discusses a vapor containing 750 ppm ferric chloride, 500 ppm aluminum chloride and lesser amounts of magnesium chloride, titanium chloride and other volatile metal chlorides.

The vapor streams from the commercial chlorinators are generally cooled to below about 300°C. to condense and separate the zirconium tetrachloride chloride and the hafnium tetrachloride chloride from the silicon tetrachloride. The vapors are then cooled to below about 50° C. to condense and separate the silicon tetrachloride from the non-condensable gases such as carbon monoxide, carbon dioxide and chlorine which are then vented to scrubbers or other means for disposal. Ferric chloride is of particular concern in the gaseous product stream from the chlorination step in commercial zirconium plants. Ferric chloride inhibits downstream separation processes for producing nuclear grade zirconium and nuclear grade hafnium. Also, iron unacceptably contaminates ceramic oxides if present in excessive amounts. In addition, all of the metal chlorides are impurities which may affect the value of the silicon tetrachloride by-product.

Silicon tetrachloride, zirconium tetrachloride and hafnium tetrachloride are physically similar in that they are symmetrical, non-polar, non-ionic tetrahedral chlorides. As the data of the following table (which summarizes information in the CRC Handbook of Chemistry and Physics, 49th edition) indicates, the sizes and vaporization temperatures of the metal chlorides present in sand generally fall between those of silicon tetrachloride and zirconium tetrachloride and its closely related hafnium tetrachloride:

TABLE I

| Compound | Molecular Weight | Cation Ionic Radius (Å) | Cation Covalent Radius (Å) | Vaporization (Sublimation) Temp. °C. |
|---|---|---|---|---|
| $PCl_3$ | 137 | 1.06 | .34 | 75 |
| $SiCl_4$ | 169 | 1.11 | .41 | 57 |
| $NiCl_2$ | 130 | 1.16 | .72 | * |
| $FeCl_3$ | 162 | 1.17 | .64 | 280 |
| $AlCl_3$ | 133 | 1.18 | .58 | (178) |
| $CrCl_3$ | 158 | 1.18 | .69 | ** |
| $ZrCl_4$ | 233 | 1.45 | .80 | (331) |

TABLE I-continued

| Compound | Molecular Weight | Cation Ionic Radius (Å) | Cation Covalent Radius (Å) | Vaporization (Sublimation) Temp. °C. |
|---|---|---|---|---|
| $HfCl_4$ | 320 | 1.44 | .81 | (317) |

*$NiCl_2$ solidifies at 1001° C.
**$CrCl_3$ solidifies at 1150° C.

Thus, it is very difficult to separate ferric chloride and other impurities from zirconium tetrachloride and hafnium tetrachloride.

SUMMARY OF THE INVENTION

It is an object of the present invention to purify the vapor stream from a sand chlorinator from metal chlorides and particularly from ferric chloride. It is a further object of the present invention to provide at least two purified vapor streams, one of which contains only small amounts of zirconium tetrachloride and hafnium tetrachloride in a silicon tetrachloride stream and the other of which is concentrated with zirconium, tetrachloride and hafnium tetrachloride.

With these objects in view the present invention resides in a method of purifying zirconium tetrachloride and hafnium tetrachloride in a vapor stream from a sand chlorinator in which the silicon and metals present in the sand feed to the chlorinator are chlorinated at temperatures above about 800° C. In the practice of the present invention, a vapor stream containing principally silicon tetrachloride, zirconium tetrachloride and hafnium tetrachloride and contaminated with ferric chloride is cooled to a temperature of about 335° C. to about 600° C. before flowing into a gaseous diffusion separative barrier. The vapor then flows through the gaseous diffusion separative barrier to adsorb the ferric chloride and separate the vapor into two streams. The one separated stream generally comprises silicon tetrachloride with preferably no more than trace amounts of other chlorides, including zirconium tetrachloride and hafnium tetrachloride. The other separated stream comprises zirconium tetrachloride and hafnium tetrachloride concentrated in silicon tetrachloride.

The gaseous diffusion separative barrier preferably employs a media selected from silica gel, alumina silicate gel, sodium calcium alumina silicate, alumina, or a mixture of these adsorbents. Highly purified vapor streams may be obtained by providing a media having a nominal pore diameter of from about 2.4Å to about 2.8Å.

DESCRIPTION OF THE DRAWING

The invention will become more readily apparent from the following description of a preferred practice thereof shown, by way of example only, in the accompanying flow sheet.

DETAILED DESCRIPTION OF THE PREFERRED PRACTICE

The flow sheet generally illustrates a sand chlorinator 10 for chlorinating zircon sand with chlorine gas at less than about 1 atmosphere pressure (gage) in the presence of carbon at temperatures of about 800° C. or more. A commercial chlorinator normally operates at more than about 1000° C. Product vapors containing entrained unreacted sand and coke fines flow out of the chlorinator 10 through a line 12 and into a hot vapor heat exchanger 14 which cools the vapors to less than about 1000° C. to solidify any nickel chloride in the product vapor and any chromium chloride if the chlorinator is operated at more than about 1150° C. Preferably the vapors are cooled to a temperature of about 600° C. or less. Importantly the vapors are cooled to a temperature of not less than about 350° C. to 400° C. so that zirconium tetrachloride does not condense.

The cooled vapors and entrained solids then flow through a line 16 to a hot vapor ceramic filter 18 which separates the entrained coke and sand and at least some of the solidified chlorides from the product vapor. The product vapor then flows through line 20 to a second heat exchanger 22 for cooling the vapors to the lowest practical operating temperature to maximize the adsorption capacity of a gaseous diffusion separative barrier 24 and yet not condense zirconium tetrachloride in the separative barrier 24. Thus, the vapor is cooled to from about 335° C. to about 600° C. and most preferably to from 350° C. to 400° C. in the second heat exchanger 22. The cooled vapors then flow through a line 23 from the second heat exchanger 22 to the separative barrier 24.

The gaseous diffusion separative barrier 24 generally separates the vapor into two vapor streams and adsorbs the ferric chloride. The separative barrier 24 preferably employs a microporous media having a relatively high surface area such as a silica gel, an alumina silicate gel, a sodium calcium alumina silicate (molecular sieve), alumina or a mixture of these adsorbents. Other adsorbents including fuller's earth, powdered magnesium hydroxide, ferrous hydroxide gel, titanium dioxide gel, tungstic acid, treated diatomaceous earth, hydrous silicate green sand, activated charcoal and mixtures of these adsorbents may be employed too. Polymeric media are not generally employed at process temperatures of about 350° C. and higher. The media preferably has a nominal pore size of from about 2.0Å to about 3.0Å and most preferably from about 2.4Å to about 2.8Å for permitting silicon tetrachloride to flow through the separative barrier as the "fast" stream and for adsorbing the "slow" ferric trichloride while screening the large heavy zirconium tetrachloride and hafnium tetrachloride. Media having larger pores may be employed but the separation may not be as complete in all cases.

The separative barrier 24 may be designed in accordance with the discussion entitled "Gas Diffusion" in Perry's Chemical Engineers' Handbook, Fourth Edition, McGraw-Hill Book Company 17-33 to 17-38, and with the article entitled "Purification of SiCl$_4$ by Adsorption Techniques" by H. C. Theuser, Journal of the Electrochemical Society, 107, January 1960, pages 29-32, both of which are incorporated by reference for these discussions. As is disclosed by Theuser, the adsorption of metallic chlorides from liquid silicon tetrachloride is particularly effective with 6-16 mesh silica gel, activated 8-14 mesh alumina and 1/16 inch sodium calcium alumina silicate pellets (molecular sieves). Also, Theuser discloses that the presence of free chlorine in the silicon tetrachloride stream (which occurs in a sand chlorinator) may convert phosphorous trichloride to phosphorous pentachloride which forms a coordination compound with aluminum trichloride.

The silicon tetrachloride stream from the separation barrier 24 contaminated with phosphorous trichloride (depending upon the amount of free chlorine and the aluminum trichloride in the vapor) and other metal chlorides and containing non-condensables such as carbon monoxide, carbon dioxide, chlorine and nitrogen flows via line 26 from the gaseous diffusion separative barrier 24 to a two stage condenser 28. The stream is cooled in a first stage down to a temperature of about 75° C. to condense the phosphorous trichloride and the metal chlorides which may have diffused through the media in the separative barrier 24 and then further cooled in a second stage down to a temperature of about 57° C. or less to condense the silicon tetrachloride. The non-condensable gases are vented to a scrubber (not shown) or other disposal means. The silicon tetrachloride may be further processed in accordance with known practices.

The screened vapor stream containing zirconium tetrachloride and hafnium tetrachloride flows via line 30 to a primary condenser 32 where the stream is cooled down to about 70° C. to about 100° C. to condense the zirconium tetrachloride and the hafnium tetrachloride. The uncondensed vapor then flows through a line 34 to a secondary condenser 36 where the vapor is cooled down to about 57° C. or less to condense the silicon tetrachloride. Alternatively, the vapor line 34 may feed the vapors to the two stage condenser 28 (not shown). The non-condensable gases flow from the secondary condenser to a scrubber or other disposal means. The zirconium tetrachloride and hafnium tetrachloride may be further processed in accordance with known practices to produce purified nuclear grade zirconium and hafnium or ceramic oxides.

What is claimed is:

1. A method of purifying zirconium tetrachloride and hafnium tetrachloride in a vapor stream from a sand chlorinator in which the silicon and metals present in sand fed to the chlorinator are converted to chlorides at temperatures over about 800° C., comprising the steps of:

cooling a vapor stream from a sand chlorinator, the vapor stream containing principally silicon tetrachloride, zirconium tetrachloride, and hafnium tetrachloride contaminated with ferric chloride, to a temperature of from about 335° C. to about 600° C.;

flowing the vapor stream through a gaseous diffusion separative barrier to produce a silicon tetrachloride-containing vapor stream concentrated in zirconium tetrachloride and hafnium tetrachloride and a silicon tetrachloride-containing vapor stream depleted in zirconium tetrachloride and hafnium tetrachloride;

adsorbing the ferric chloride in the separative barrier; and recovering the silicon tetrachloride stream concentrated in zirconium tetrachloride and hafnium tetrachloride separately from the silicon tetrachloride stream depleted in zirconium tetrachloride and hafnium tetrachloride.

2. The method of claim 1, comprising the additional step of filtering the cooled vapor stream from the chlorinator before flowing the stream through the gaseous diffusion separative barrier.

3. The method of claim 1, wherein the vapor stream from the chlorinator is cooled to from 350° C. to 400° C. before flowing through the gaseous diffusion separative barrier.

4. The method of claim 1, including the additional step of:

cooling the separated stream containing concentrated zirconium tetrachloride and hafnium tetrachloride to a temperature between about 60° C. and about 315° C. to condense the zirconium tetrachloride and the hafnium tetrachloride from the stream.

5. The method of claim 4, including the additional steps of: further cooling the separated stream from a temperature between about 60° C. and about 315° C. to a temperature below about 57° C. to condense the silicon tetrachloride from the stream.

6. A method of purifying a vapor stream from a sand chlorinator in which the silicon and metals present in sand are converted to chlorides at temperatures over about 1000° C., comprising the steps of:

filtering the vapor steam from a zircon sand chlorinator operating over about 1000° C. to filter unreacted zircon sand and unreacted coke from the vapor stream, which contains principally silicon tetrachloride, zirconium tetrachloride and hafnium tetrachloride contaminated with ferric chloride and nickel chloride, and uncondensable gases;

cooling the vapor stream to a temperature between about 335° C. and about 970° C. to solidify the nickel chloride;

filtering the vapor stream to filter the solid nickel chloride and the unreacted zircon sand and the unreacted coke from the stream;

flowing the filtered vapor stream through a gaseous diffusion separative barrier selected from the group consisting of silica gel, alumina silicate, and alumina for adsorbing the ferric chloride;

separately recovering a concentrated zirconium tetrachloride and hafnium tetrachloride vapor also containing silicon tetrachloride as a principal component and a silicon tetrafluoride stream from the gas diffusion barrier;

cooling the concentrated vapor stream to a temperature of about 60° C. to about 315° C. to condense the zirconium tetrachloride and the hafnium tetrachloride;

separating the condensed zirconium tetrachloride and the condensed hafnium tetrachloride from the cooled vapor stream;

further cooling the vapor stream to a temperature about 57° C. to condense the silicon tetrachloride from the uncondensable gases; and separating the condensed silicon tetrachloride from the uncondensable gases.

* * * * *